June 17, 1952 W. J. HOGG ET AL 2,600,651

CHASER MOUNTING

Filed Aug. 17, 1948 4 Sheets-Sheet 1

WITNESS

Clyde H. Hrynes

INVENTOR.
William J. Hogg, and
David R. Powell
BY Woodling and Krost
attorneys.

CHASER MOUNTING

Filed Aug. 17, 1948 4 Sheets-Sheet 2

INVENTOR.
William J. Hogg, and
David R. Powell
By Woodling and Krost
attys.

WITNESS

Clyde H. Haynes

June 17, 1952 W. J. HOGG ET AL 2,600,651

CHASER MOUNTING

Filed Aug. 17, 1948 4 Sheets-Sheet 3

INVENTOR.
William J. Hogg, and
David R. Powell
by Woodling and Krost
attys.

WITNESS
Clyde H. Haynes

June 17, 1952 W. J. HOGG ET AL 2,600,651

CHASER MOUNTING

Filed Aug. 17, 1948 4 Sheets-Sheet 4

INVENTOR.
William J. Hogg and
David R. Powell
By Woodling and Krost
attys.

WITNESS

Clyde H. Haynes

Patented June 17, 1952 2,600,651

UNITED STATES PATENT OFFICE 2,600,651

CHASER MOUNTING

William J. Hogg and David R. Powell, Cleveland, Ohio, assignors to The National Acme Company, a corporation of Ohio Application August 17, 1948, Serial No. 44,708

9 Claims. (Cl. 10—104)

Our invention relates in general to chasers used in cutting threads and in particular to the mounting of chasers on a die head for the cutting operation.

When a plurality of chasers are used simultaneously to cut threads on a workpiece it is necessary that each of these chasers be properly aligned with the other chaser during the cutting operation so that each chaser will do its share of the cutting of the workpiece and so that a uniform thread of the desired size and shape will be obtained. It has always been a tedious job to properly align a plurality of chasers into their respective correct positions in the operating machine. To further this problem is the fact that different sets of chasers must be used for different threads, since each chaser is constructed to cut a definite thread. With these problems in mind, one of the principal objects of our invention is to provide a simple, inexpensive and efficient chaser mounting in which the chasers may be accurately positioned on a die head before the die head is placed in the operating machine.

Another object of our invention is to provide a chaser mounting in which a chaser holder has a chaser-receiving groove in which a chaser is held by first and second means which respectively urge the chaser in opposed directions in the groove to hold it in a predetermined position.

Still a further object of our invention is to provide a chaser holder and a chaser with cooperating means which exert forces on the chaser in opposing directions to hold the chaser in its predetermined position in the chaser holder and relative to a reference plane.

Another object of our invention is to provide a chaser mounting in whcih the chaser holder is adjustably movable on a chaser holder slide and in which a fastening screw extending through the chaser holder and threaded into the slide engages a sloping portion of the chaser holder to secure the chaser holder in the desired position on the slide.

A further object of our invention is to provide a chaser mounting in which a slide has a tongue on one side thereof and a chaser holder has a tongue-receiving groove for receiving this tongue, and in which a bolt extends through the chaser holder and into the slide at an angle to the surface of the slide.

A still further object of our invention is to provide a die head in which the chaser holder is adjustably movable on a slide in a plane perpendicular to the axis of the die head, and along a line extending substantially at right angles to a radius line extending through the chaser hodler and the axis.

Other objects and a fuller understanding of our invention may be had by referring to the following description and claims, taken in conjunction with the accompanying drawings, in which:

Figure 1 of our drawings is an exploded view of a chaser and chaser holder;

Figure 1*a* is a view of a chaser mounted in the chaser holder;

Figure 7:
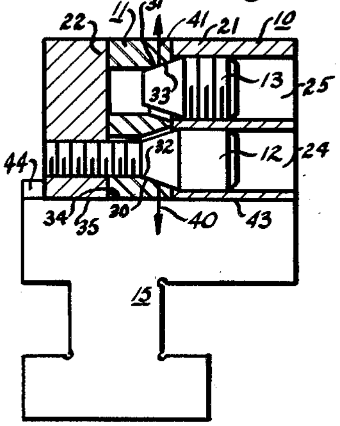
Figure 7 is a sectional view the same as Figure 6, but with the set screw compensating the urging of the fastening screw, thus setting up the opposing force in the chaser.
Figure 7A:
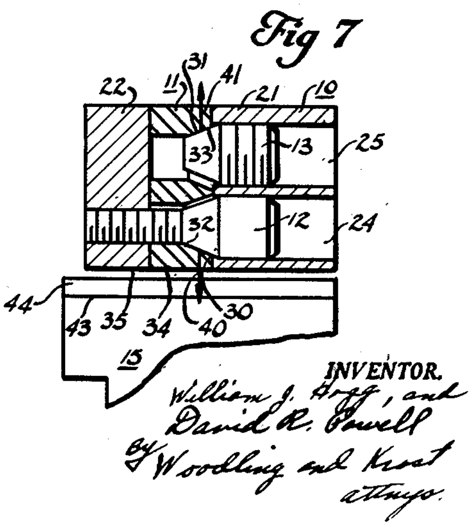
Figures 8, 9, 10, 11, 12:
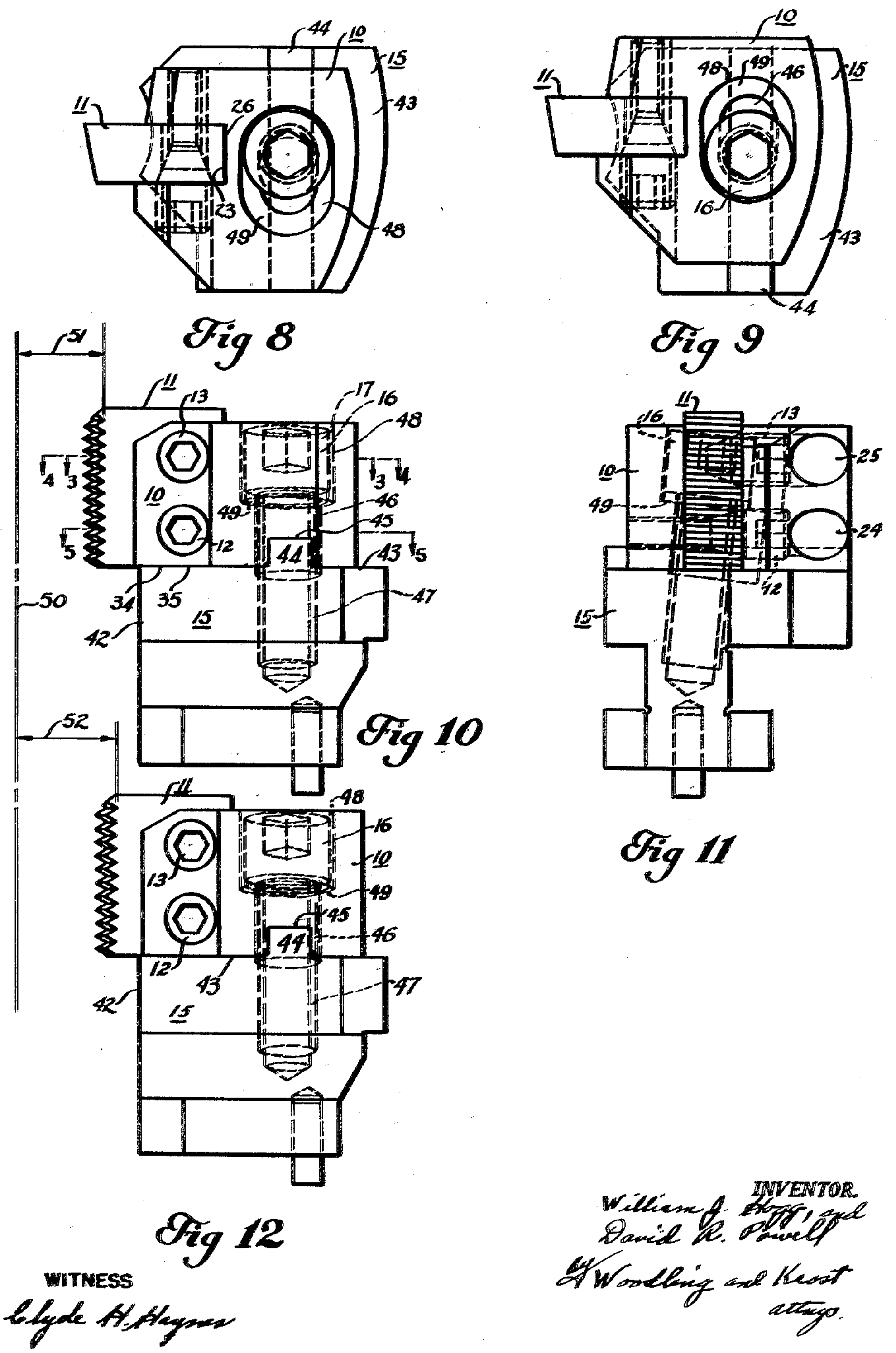
Figure 13:
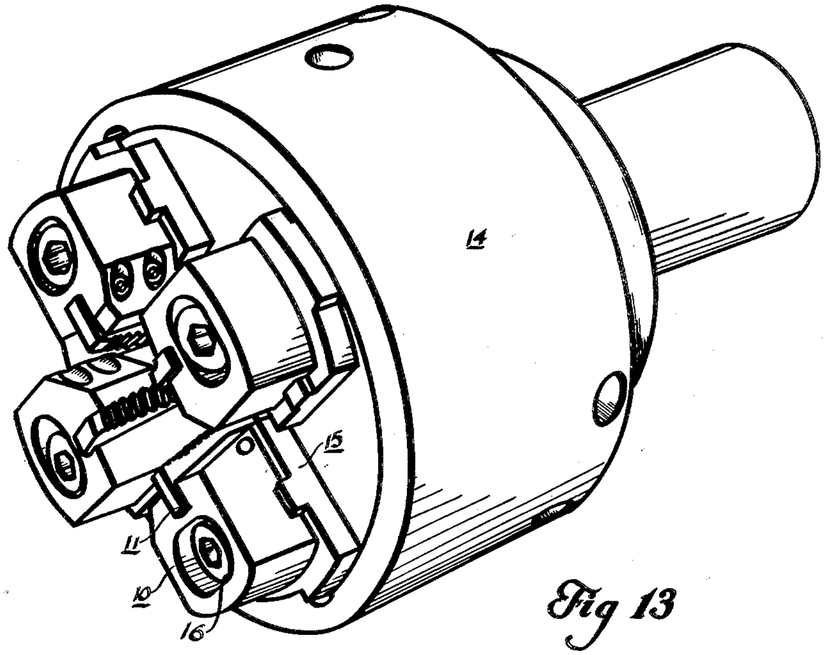
Figure 14:
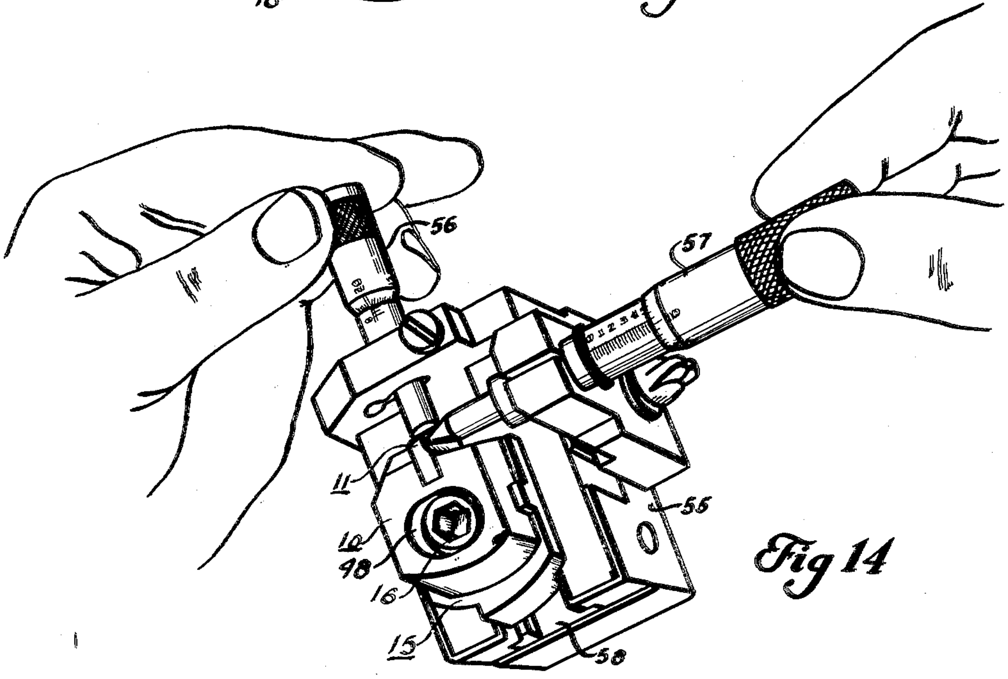

Figure 7*a* is a sectional view of Figure 7 with the chaser holder removed from the surface block;

Figure 8 is a view showing the chaser holder mounted on the slide;

Figure 9 is a view showing the chaser holder mounted on the slide in a different position than that of Figure 8;

Figure 10 is an elevational view showing the chaser holder mounted on the slide;

Figure 11 is an end view showing the chaser holder mounted on the slide;

Figure 12 is an elevational view showing the chaser hloder mounted on the slide for a different diameter workpiece than that of Figure 10;

Figure 13 is a perspective view of a die head with all of the chasers mounted in their chaser holder and adjusted on their slides, the slides being a part of the die head; and Figure 14 is a perspective veiw of a gauging device which may be used to adjust the chaser mounting.

Figure 1:
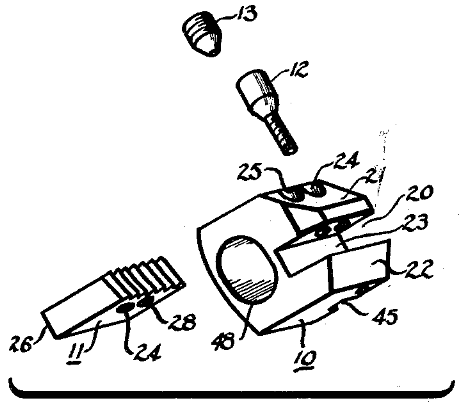
Figure 1A:
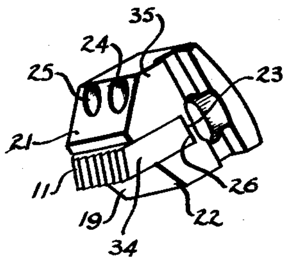
Figure 2:
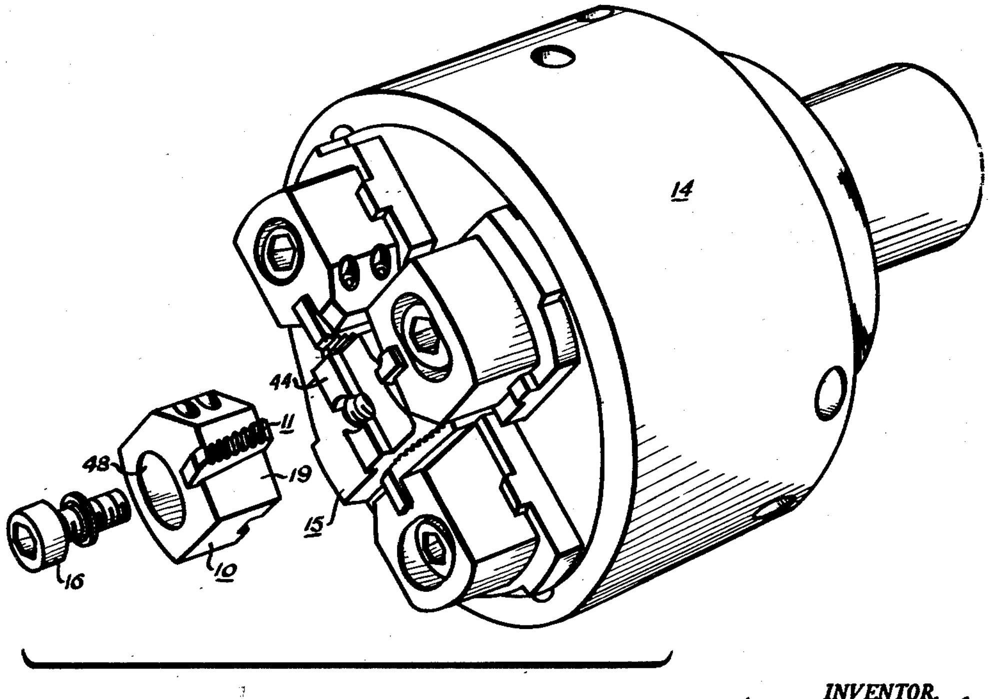
Figure 2 is a view of a die head with a plurality of chasers mounted thereon and with the chaser holder of Figure 1 removed.

In Figures 1 and 1*a* of our drawings, we illustrate chaser holder 10 which supports the chaser 11. This chaser 11 is held in the chaser holder 10 by a fastening screw 12 and a set screw 13 which extend transversely of the chaser and are threaded into the chaser holder. When the chaser 11 is assembled into the chaser holder 10, as illustarted in Figure 2 of our drawings, it may be mounted on a die head 14. Figure 2 illustartes the complete chaser mounting and shows the die head 14 as having slides 15 carried in a plane substantially perpendicular to the axis of the die head and spaced at annular intervals about a work-receiving opening. This work-receiving opening is not illustrated since it is common to die heads of this type and extends with the axis of the work-receiving opening superimposed upon the axis of the die head. We have illustrated Figure 2 with the chaser holder 10 (illustrated in Figure 1), removed from one of the slides 15 to better illustrate the construction thereof. A bolt 16 extending through the chaser holder 10 is threaded into the slide 15 to hold the chaser holder thereon.

Throughout our description we will refer to one of the chaser mountings used in a set of mountings on the die head, since all of the chasers and chaser holders are substantially the same. In referring to just one of the chasers and chaser mountings, we do not thereby limit the scope of our invention, but include any number of chasers and chaser holders which may be used on a die head or other mounting device which is used in the threading of workpieces. It is also understood that the die head may be of any suitable design or construction which will carry as a part thereof the slides 15. The details of construction and operation of the die head are of any common type which will move the chasers radially into and out of the workpiece at the beginning and end of the threading operation.

The chaser holder 10 is defined as having a face side 19 with a chaser-receiving groove 20 therein. As is illustrated in Figures 1 to 7 of our drawings, this chaser-receiving groove 20 defines opposing walls, namely, a forward wall 21 and a rearward or back wall 22, and a bottom wall 23. A threaded fastening screw opening 24 extends transversely of this chaser-receiving groove 20 and through the opposing walls 21 and 22 with the axis of the opening 24 substantially parallel to the bottom wall 23. In this particular instance, we have found it desirable to have the fastening screw opening 24 threaded in the rearward wall 22 and enlarged in the forward wall 21 to receive the head of the fastening screw 12. We have also provided one of the opposing walls, in this instance the forward wall 21, with a threaded set screw opening 25 to receive the set screw 13.

Figure 3:
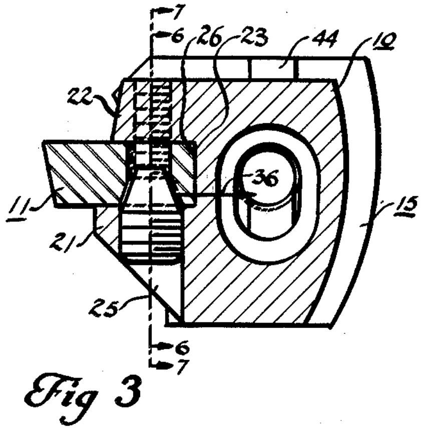
Figure 3 is a cross-sectional view taken along line 3—3 of Figure 10 of a chaser and chaser holder illustrating the force exerted upon the chaser to hold it against the bottom wall of the chaser-receiving groove.

In Figure 3 of our drawings, we illustrate in cross section through the set screw that the set screw opening 25 is axially aligned in a plane parallel to the bottom wall of the chaser-receiving groove. The axis of the set screw opening 25 is also substantially parallel to the axis of the fastening screw opening 24, and is substantially perpendicular to the opposing walls 21 and 22.

The chaser 11 has a chaser fastening screw opening 28 and a chaser set screw opening 29. This chaser fastening screw opening 28 is encircled by a tapered shoulder 30, and the chaser set screw opening 29 by a tapered shoulder 31. These openings extend substantially transversely through the chaser. When the chaser 11 is inserted in the chaser-receiving groove 20, the axes of the openings in the chaser are substantially parallel to the axes of the openings in the chaser holder 10. However, the distance between the axes of the openings in the chaser and the back surface 26 of the chaser 11 which abuts the bottom wall 23 of the chaser holder 10, is other than the distance between the axes of the openings in the chaser holder and the bottom wall 23. Likewise, the distance between the axes of the openings 28 and 29 of the chaser is other than the distance between the axes of the openings 24 and 25 of the chaser holder 10. We have also provided the fastening screw 12 with a shoulder 32 and the set screw 13 with a shoulder 33. In Figure 3 of our drawings, we illustrate that when both of these screws 12 and 13 are tightly holding the chaser 11 in the chaser holder 10, the shoulders 32 and 33 on the screws cooperate with the tapered shoulders 30 and 31 on the chaser 11 to wedgingly force the chaser 11 against the bottom wall 23 of the chaser-receiving groove 20. The arrow 36 of Figure 3 has a length to represent the total force of both of these screws 12 and 13 in wedgingly forcing the chaser against the bottom wall 23.

Figure 4:
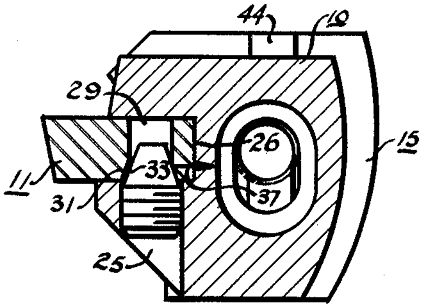
Figure 4 is a sectional view taken along line 4—4 of Figure 10 showing the force exerted by the set screw in urging one end of the chaser against the bottom wall of the chaser-receiving groove.

In Figure 4, we illustrate that part of the force represented by arrow 36 with an arrow 37, which is established by the tightening of the set screw 13.

Figure 5:
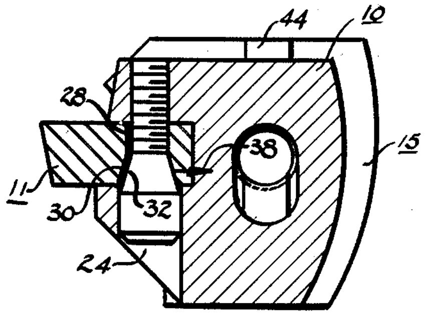
Figure 5 is a sectional view taken along line 5—5 of Figure 10 showing the fastening screw urging the other end of the chaser against the bottom wall of the chaser-receiving groove.

Arrow 38 in Figure 5 similarly indicates that part of the force represented by the arrow 36 which is established by the tightening of the fastening screw 12 to urge the chaser 11 against the bottom wall 23 of the chaser holder 10. It is also illustrated in the drawings that the fastening screw 12 and the set screw 13 force the chaser 11 against the back or rearward wall 22 of the chaser-receiving groove 20.

Figure 6:
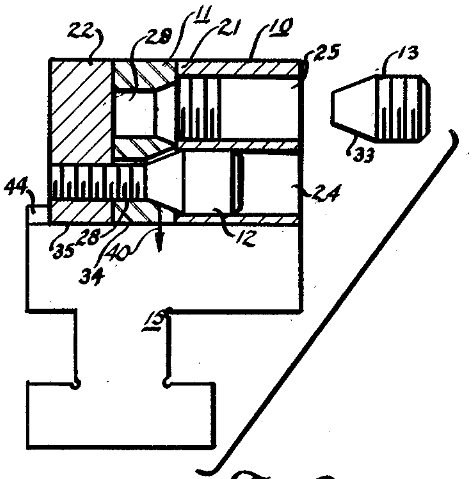
Figure 6 is a sectional view along line 6—6 of Figure 3 with certain parts omitted for clarity, with the set screw removed showing the fastening screw urging the chaser in one direction in the groove.

In Figure 6 of our drawings, the chaser 11 is shown in cross section, and with the fastening screw 12 inserted in the fastening screw opening 24 in the chaser holder 10 and extending through the fastening screw opening 28 in the chaser 11. This Figure 6 view is substantially at right angles to that of Figure 3, and illustrates by means of arrow 40 the forcing of the chaser 11 in one direction endwise in the chaser-receiving groove 20. The cooperating shoulder of the chaser 11 and the fastening screw 12 causes the fastening screw to force the chaser endwise in the chaser-receiving groove 20.

In assembling the chaser 11 and the chaser holder 10, the chaser holder 10 is laid on a surface block 15 or any other flat surface separate from the block. The slide surface 35 of the chaser holder 10 engages this surface block and defines a reference plane extending transversely of the chaser-receiving groove 20. The chaser 11 is then inserted in the chaser-receiving groove 20, the end surface 34 of the chaser resting on the surface block 15. The fastening screw 12 is then tightened into the fastening screw opening 24 in the chaser holder 10. The cooperating shoulders of the chaser and the fastening screw 12 cause this fastening screw 12 to force the chaser 11 toward the reference plane and thereby position the end surface 34 of the chaser in a plane which is at a predetermined position relative to this reference plane defined by the slide surface 35. Generally, the end surface of the chaser lies in a plane which is substantially coextensive with the reference plane. However, it is understood that the end surface may lie in a plane which is at a predetermined position relative to the reference plane. After the chaser 11 has been thus correctly positioned in the chaser-receiving groove 20 of the chaser holder, the set screw 13 is inserted in the chaser holder as illustrated in Figure 7. The cooperating shoulders between the set screw 13 and the chaser 11 force the chaser away from the reference plane, thereby offsetting or compensating the force exerted on the chaser by the fastening screw 12. The arrow 41 in Figure 7 represents the offsetting or compensating force established by the set screw to offset the force established by the fastening screw 12 and represented by the arrow 40. The set screw thus locks the end surface of the chaser substantially in a plane which is at a predetermined position relative to the reference plane. This end surface may be locked in a plane which is coextensive with the reference plane. The chaser and chaser holder may be removed from the surface block 15, as indicated in Figure 7*a*, without any danger of the chaser 11 moving in the chaser holder 10. We have discovered that by using the combination of the fastening screw and the set screw, each having shoulders cooperating with shoulders on the chaser to establish opposing forces which tend to move the chaser in opposite directions in the chaser-receiving groove, we have developed a chaser holder which is easy to use and which may be accurately set for accurate control of the threading.

In Figures 8 to 12 of our drawings, we illustrate the mounting of the chaser holder with the chaser therein on the slide 15 which is carried by the die head 14. For purposes of clarity we have included the slide 15 in these figures of our drawing. It is understood that the chaser holder 10 including the chaser 11 may be mounted on the slide 15 while it is in the die head 14. The slide 15 is illustrated as having an inner wall surface and as having a face surface 43 with a tongue 44 extending outwardly therefrom. When the slide is in the die head, this tongue 44 is in a plane substantially perpendicular to the axis of the die head and extends substantially at right angles to a radius line extending through the tongue and the axis of the die head. We have provided the slide surface 35 of chaser holder 10 with a tongue-receiving groove 45 to receive the tongue 44 when the chaser holder 10 is mounted on the slide 15. The cooperation of the tongue 44 and the tongue-receiving groove 45 of the chaser holder 10 permits movement of the chaser holder 10 in a line substantially at right angles to a radius line drawn through the chaser holder and the axis of the die head, and also in a plane at substantially right angles to the axis of the die head.

The bolt 16 extends through an elongated opening 46 in the chaser holder which merges with the tongue-receiving groove 45 and is threaded into a threaded opening 47 in the tongue 44 and the slide 15. We have provided the chaser holder 10 with this elongated opening 46 so that the chaser holder 10 may be slid back and forth along the tongue 44 and into a plurality of adjustment positions while the bolt 16 is threaded into the slide. The elongated opening 46 in the chaser holder 10 is illustrated in the drawings as having an enlarged portion 48 to receive the head 17 of the bolt 16. The enlarged portion 48 also cooperates with the remainder of the opening 46 to provide a shoulder 49 against which the head 17 of the bolt abuts. In Figure 11 of our drawings we best illustrate that the bolt 16 is positioned so that its axis is not parallel to the axis of the die head. One end of the shoulder 49 in the chaser holder 10 is disposed at a further distance from the end surface 34 of the chaser holder 10 than the other end of the shoulder 49. We have discovered that this slanting of the fastening bolt and the making of this shoulder 49 in a wedge-like shape, causes the chaser holder to be tightly held in its correct position on the slide 15. Working forces on the chaser 11 tend to move the chaser holder 10 along the tongue 44. This wedging effect of the shoulder 49 against the head 17 of the bolt continually tightens the chaser between the head 17 of the bolt 16 and the face surface 43 of the slide 15 so that the chaser will not become out of adjustment.

In Figures 10 and 12, the dash-dot line 50 is used to represent the center line of the workpiece which is being threaded. Many times the same chaser is used for different diameters of threading. The arrow 51 represents the distance from the chaser used for cutting one diameter of the thread to the center line, while the arrow 52 represents the distance from the chaser to the center line for another diameter of threading. We have discovered that by using die heads having slides 15 with the tongues 44 in different positions we can use the same chaser for different diameters of threads. For example, for a thread of radius 51 as illustrated in Figure 10, the chaser holder is mounted on the slide 15 of Figure 10. Likewise, for the larger diameter represented by radius 52 of Figure 12, the same chaser holder as used in Figure 10 may be mounted on the slide of Figure 12. This slide in Figure 12 is the same as the slide in Figure 10, except that the tongue 44 is further from the axis of the die head. In Figure 12 the tongue is spaced on the face surface 43 at a distance from the inner wall surface 42 other than the distance at which it is spaced from the inner wall surface in Figure 10.

In Figure 13 of our drawings we represent in a perspective view a die head with four of the chaser mountings, in which the chaser holders 10 are mounted on slides 15. Although we have illustrated four of these holders and mountings on one die head, it is understood that any suitable number of chasers may be used together and that we do not limit our invention to the exact number of four.

Should it be desired to mount a chaser 11 in the holder 10 and then mount this chaser holder 10 onto the slide 15 before the slide 15 is mounted in the die head 14, we have found it convenient to use the gauge as illustrated in Figure 14. This gauge illustrated in Figure 14, and carrying reference numeral 55, has micrometer points 56 and 57 disposed at 90 degree angles to each other and positioned so that the micrometer points simultaneously contact the chaser 11. The gauge 55 has a slot 58 extending lengthwise on the top thereof and in alignment with the micrometer 56. The micrometer 57 thereby extends transversely of the slot 58. This slot 58 is adapted to receive the slide 15. In using the gauge, the workman simply puts the slide 15 in the slot 58 and proceeds to mount the chaser holder thereon by means of the bolt 16, as hereinbefore referred to.

The chaser 11 is also mounted in the chaser-receiving groove 20 of the chaser holder 10 and is fastened therein by means of the fastening screw 12 and set screw 13. The fastening screw 12 and chaser 11 have the cooperating shoulders which cammingly engage to force the end surface 34 of the chaser against the surface 43 of the slide. The set screw 13 and chaser also have their cooperating shoulders which cammingly engage whereby tightening of the set screw 13 forces the chaser 11 in the opposite direction, thus relieving the pressure between the end surface 34 and the slide block surface 43. See Figure 6. The workman can adjust the fastening screw 12, set screw 13 and bolt 16 until he has positioned the chaser in correct position for mounting it on the die head. The micrometers 56 and 57 are adjusted against the chaser to insure the workman in his gauging the chaser at its correct position relative to the slide. After the chaser has thus been accurately mounted on the slide 15, the slide 15 may be easily mounted in the die head 14.

The chaser 11 can be set in the chaser holder 10 while the holder is fastened to the slide block 15 in the die head 14; or the chaser can be located separately on a bench by means of a gauge 55, or the chaser can be located separately on a surface plate as long as the end 34 of the chaser is flush with the bottom 35 of the chaser holder. As soon as the adjusting fastening screw 12 holding the chaser in the correct position is adjusted to bring the chaser end surface 34 even with the bottom surface 35, that is, the reference plane, the set screw 13 is tightened up to build up a pressure between the two screws, so that the chaser cannot move endwise, and will be held in that fixed position. The chaser has no direct connection or engagement with the slide block. The chaser holder and chaser can thereby be removed from the slide block for grinding of the chaser and another chaser and chaser holder mounted on the slide block when chasers have to be reground.

Although our invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A chaser mounting comprising, a chaser holder having a chaser-receiving groove defined by a front wall, a back wall, and a groove, first means carried by the front wall and extendable into the groove, second means carried by the back wall and extending across the groove and through the front wall, said second means being spaced from the first means, first and second shouldered openings in the chaser spaced apart a distance other than the distance at which the first and second means are spaced apart, said first and said second means having cooperating means with the first and second shouldered openings to hold the chaser in a predetermined position in the chaser-receiving groove.

2. A chaser tool comprising, a chaser holder having a chaser-receiving groove defined by opposing side walls and a bottom wall, at least one of said side walls having spaced threaded openings therein, a chaser in said chaser-receiving groove and having cam surfaces aligned off-center with the threaded openings in a plane parallel with the bottom wall and means threaded in said openings and cooperating with said cam surfaces to jointly urge said chaser against the bottom wall and the opposite side wall, said means respectively urging said chaser in opposite directions in said groove to hold the chaser in a predetermined position in the chaser holder.

3. A chaser mounting for supporting a chaser on each of the slides carried by a die head in a plane substantially perpendicular to the axis of the die head and spaced at annular intervals thereabout, the provision of a tongue carried by each of said slides and parallel with said plane and extending substantially at right angles to a radius line extending through said tongue and said axis, a chaser holder slidably mounted on each slide and having a groove receiving said tongue, said chaser holder having an opening therethrough, and a slanted surface about said opening and at an angle to said plane, a bolt having a head abuttable against said slanted surface, said bolt extending through said opening and threaded into said slide at an angle other than a right angle to the plane in which the slide is positioned to adjustably hold the chaser holder in a predetermined position on the slide.

4. A chaser mounting for supporting a chaser on each of the slides carried by a die head in a plane substantially perpendicular to the axis of the die head and spaced at annular intervals thereabout, the provision of a tongue carried by each of said slides and parallel with said plane and extending substantially at right angles to a radius line extending through said tongue and said axis, a chaser holder slidably mounted on each slide and having a groove receiving said tongue, said chaser holder having an elongated opening, a slanted internal shoulder in said chaser holder extending internally about said opening and disposed at an angle to said plane, a bolt extending through said opening and threaded into said slide at an angle other than a right angle to the plane in which the slide is positioned to adjustably hold the chaser holder in a predetermined position on the slide said bolt and said internal shoulder cooperatively and wedgingly maintaining said chaser holder in the said predetermined position on the slide.

5. In a chaser tool having a chaser holder and a chaser, the provision of said chaser holder having a chaser-receiving groove and having a first surface defining a reference plane extending transversely of the chaser-receiving groove, a chaser inserted in said chaser-receiving groove and having an end surface, a fastening screw extending through said chaser and threaded into said chaser holder, said fastening screw and said chaser having cooperating shoulders which urge the chaser toward the reference plane and which position the end surface of the chaser in a plane which is substantially coextensive with said reference plane, and a set screw threaded in said chaser holder and engaging said chaser, said chaser and said screws having cooperating surfaces causing said set screw to offset the force of the fastening screw and thereby lock the end surface of the chaser substantially in the reference plane.

6. In a chaser tool having a chaser holder and a chaser, the provision of said chaser holder having a chaser-receiving groove and having a first surface defining a reference plane extending transversely of the chaser-receiving groove, a chaser inserted in said chaser-receiving groove and having an end surface, a fastening screw extending through said chaser and threaded into said chaser holder, said fastening screw and said chaser having cooperating shoulders which urge the chaser toward the reference plane and which position the end surace of the chaser in a plane which is at a predetermined position relative to said reference plane, and a set screw threaded in said chaser holder and engaging said chaser, said chaser and said screws having cooperating surfaces causing said set screw to offset the force of the fastening screw and thereby lock the end surface of the chaser substantially in said plane which is at said predetermined position relative to said reference plane.

7. A chaser mounting comprising a chaser holder having a chaser receiving groove defined by front and back side walls spaced apart and a bottom wall, first means threaded into one of said walls and extendable into said chaser receiving groove, second means threaded into one of said walls and extendable into said groove at a spaced distance from said first means, a chaser in said groove having first and second tapered shoulders spaced apart a distance other than the distance at which the first and second means are spaced apart, said first and second means having tapered shoulders cooperating with said first and second tapered shoulders to hold the chaser against one of said side walls and said bottom wall and also in a predetermined position in the chaser receiving groove.

8. A chaser mounting comprising a chaser holder having a chaser receiving groove defined by a front wall, a back wall, and a groove, a set screw threaded into said front wall and extendable into the groove, a fastening screw extending through the front wall across the groove and threaded into the back wall, said fastening screw being spaced from the set screw, a shouldered opening in the chaser through which the fastening screw extends, a set screw engageable shoulder in the chaser at a distance from said opening other than the distance at which the set screw and the fastening screw are spaced apart, said set screw and said fastening screw having means cooperating with the shoulders on the chaser to hold the chaser against the back wall and in a predetermined position in the chaser receiving groove.

9. A chaser mounting comprising a chaser holder having a chaser receiving groove defined by spaced side walls and bottom wall, a set screw threaded into a side wall and extendable into the groove, a fastening screw extending through one side wall across the groove and threaded into the other side wall, said fastening screw being spaced from the set screw, a shouldered opening in the chaser through which the fastening screw extends, a set screw engageable shoulder in the chaser at a distance from said opening other than the distance at which the set screw and the fastening screw are spaced apart, said set screw and said fastening screw having means cooperating with the shoulders on the chaser to hold the chaser against two of the walls and in a predetermined position in the chaser receiving groove.

WILLIAM J. HOGG.
DAVID R. POWELL.

REFERENCES CITED

The following references are of record in the file of this patent:

UNITED STATES PATENTS

| Number | Name | Date |
|---|---|---|
| 1,080,565 | Koontz | Dec. 9, 1913 |
| 1,117,363 | Fisher | Nov. 17, 1914 |
| 1,218,992 | Ford | Mar. 13, 1917 |
| 1,937,418 | Warren | Nov. 28, 1933 |
| 2,108,149 | Strickland | Feb. 15, 1938 |
| 2,119,984 | Breitenstein | June 7, 1938 |
| 2,225,507 | Overgiard | Dec. 17, 1940 |
| 2,232,854 | Hogg | Feb. 25, 1941 |
| 2,335,570 | Montgomery | Nov. 30, 1943 |
| 2,369,587 | Macafee | Feb. 13, 1945 |